Jan. 17, 1928.
J. R. SAYLOR
1,656,758
AUTOMATIC TAPPING MACHINE
Filed June 29, 1923   9 Sheets-Sheet 5
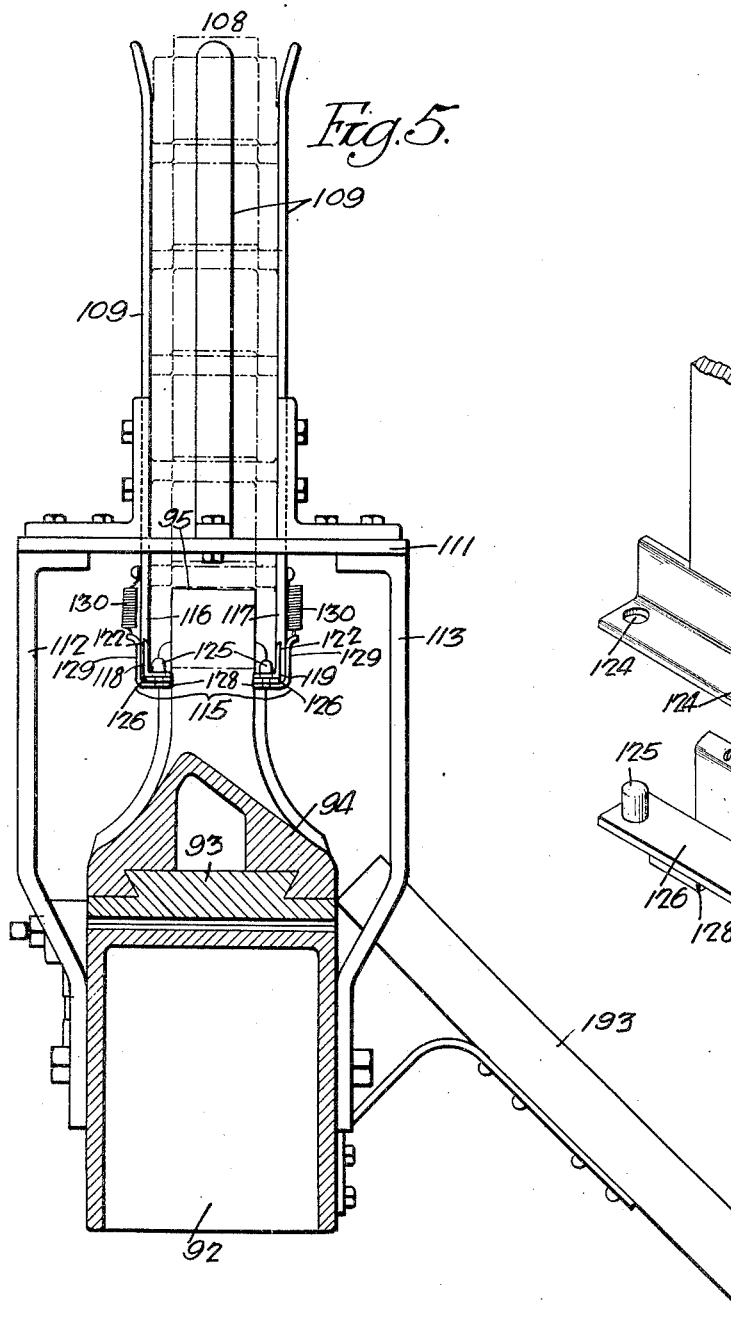
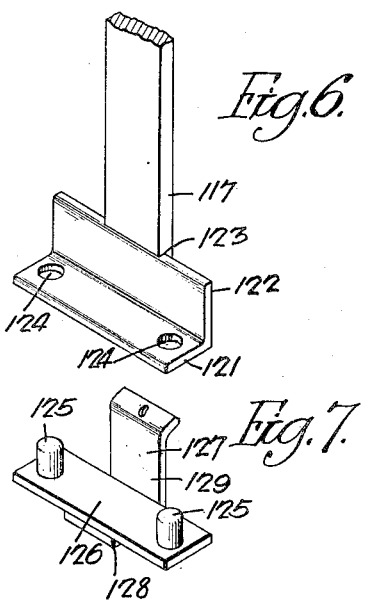
Inventor-
John R. Saylor.
by his Attorneys.

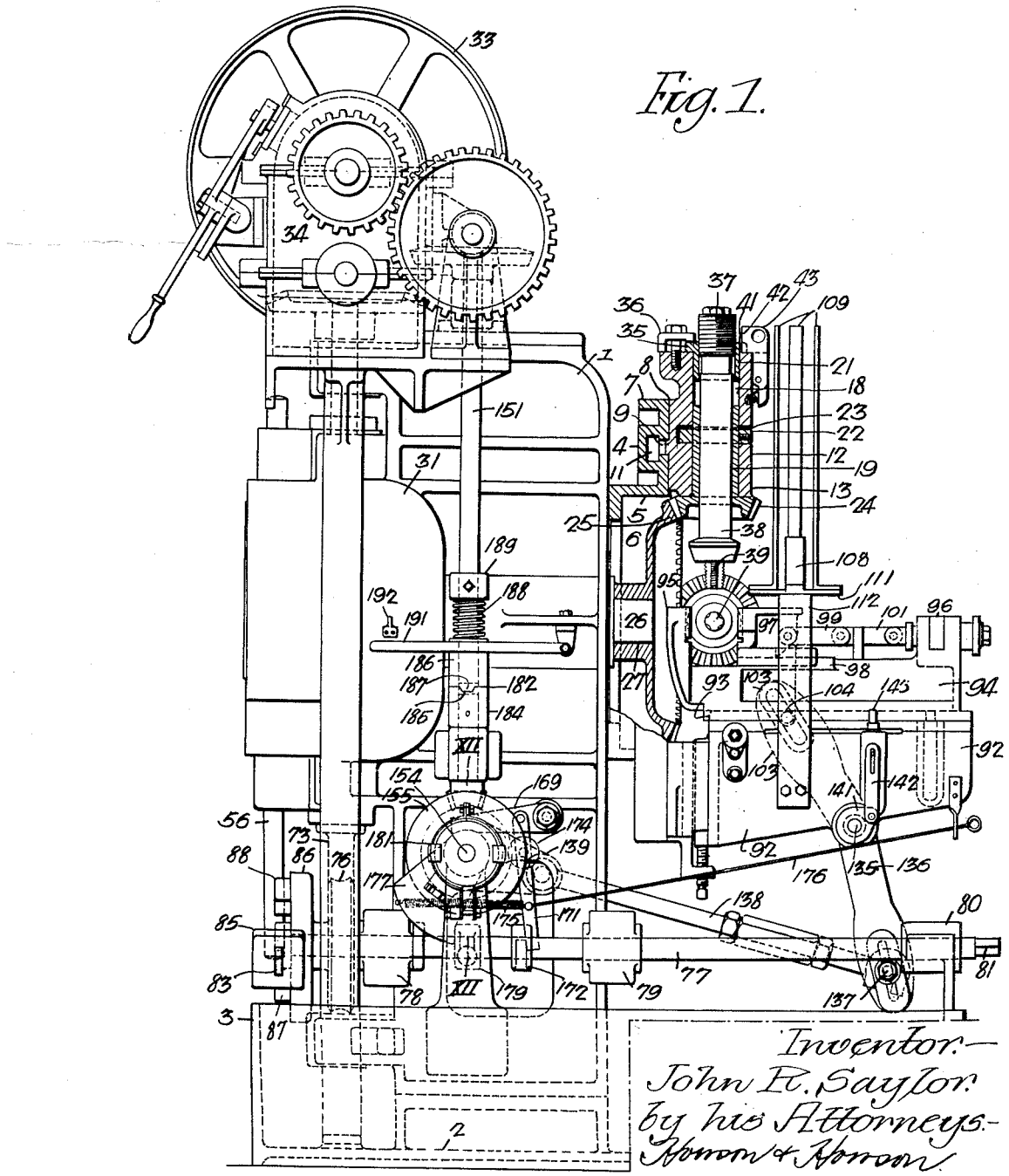

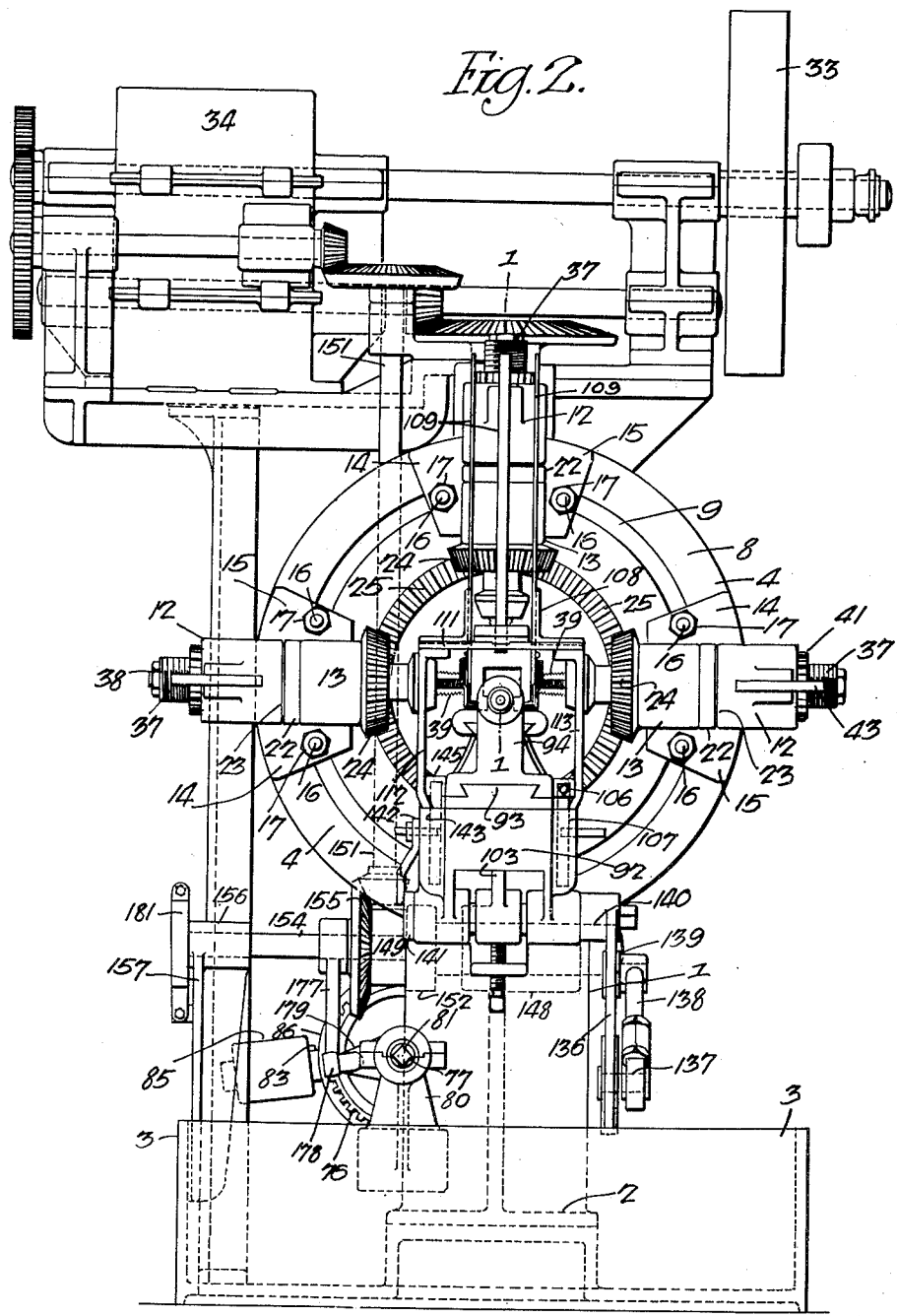

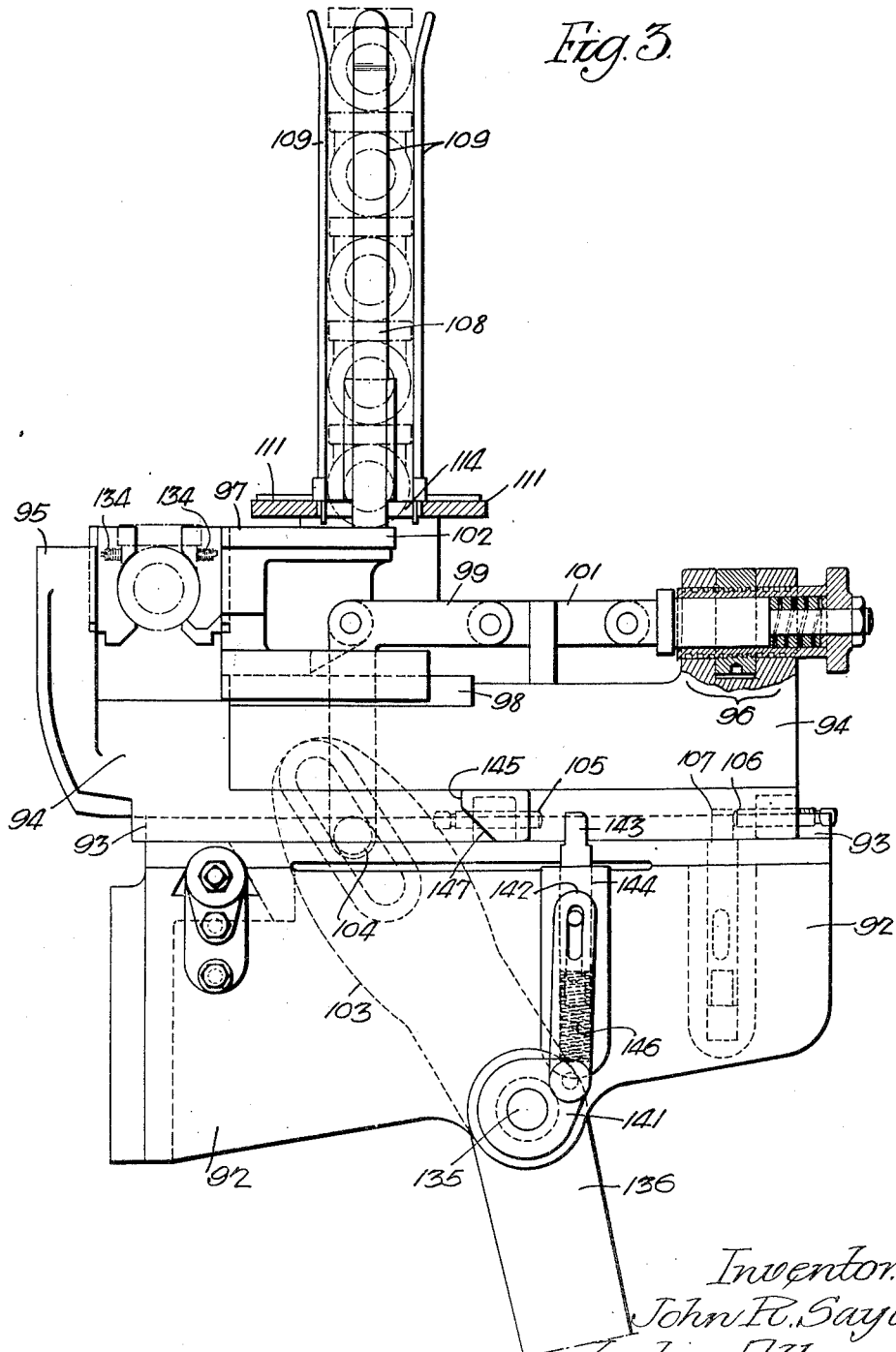

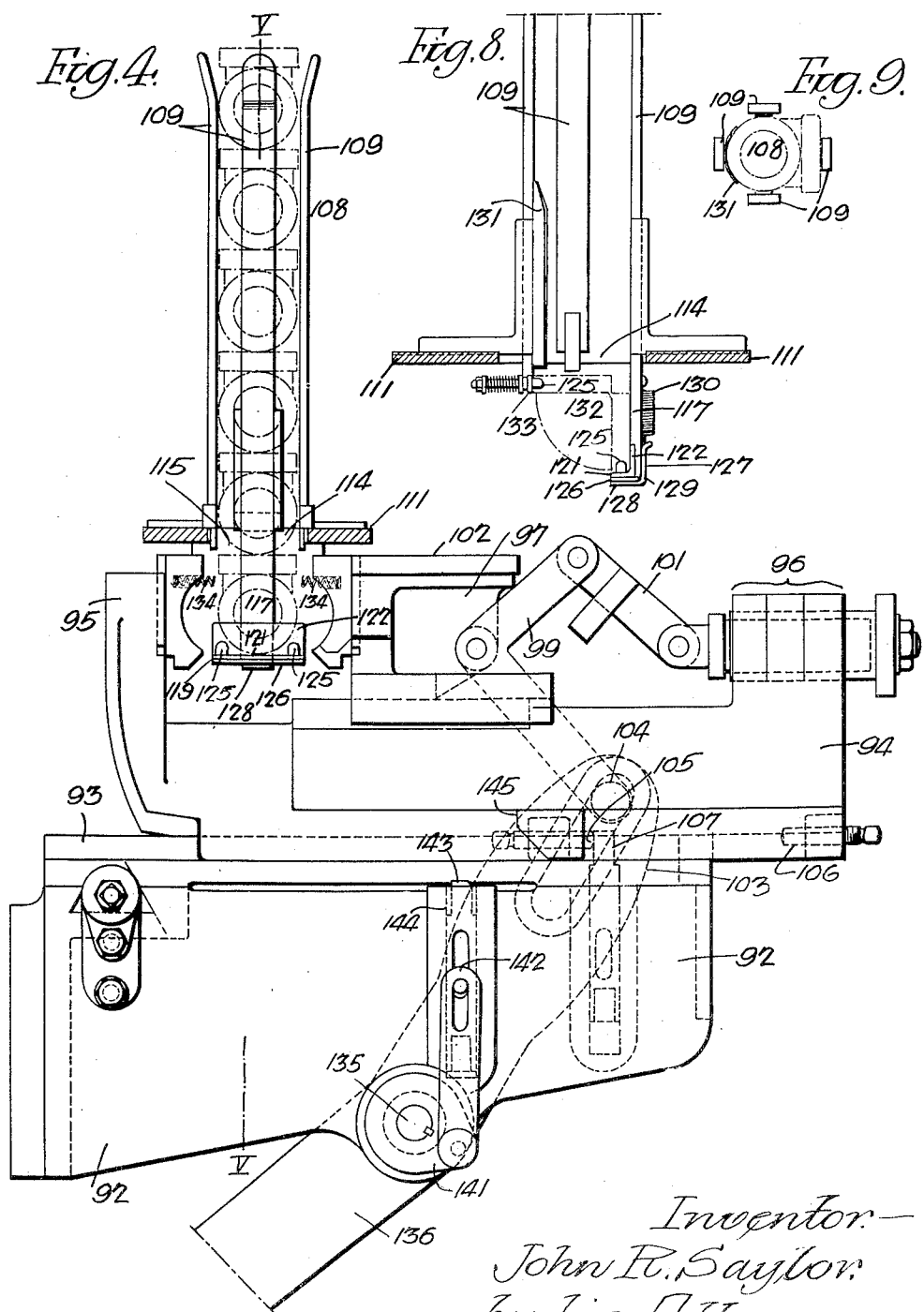

Jan. 17, 1928.

J. R. SAYLOR 1,656,758

AUTOMATIC TAPPING MACHINE

Filed June 29, 1923

Inventor
John R. Saylor.
by his Attorneys

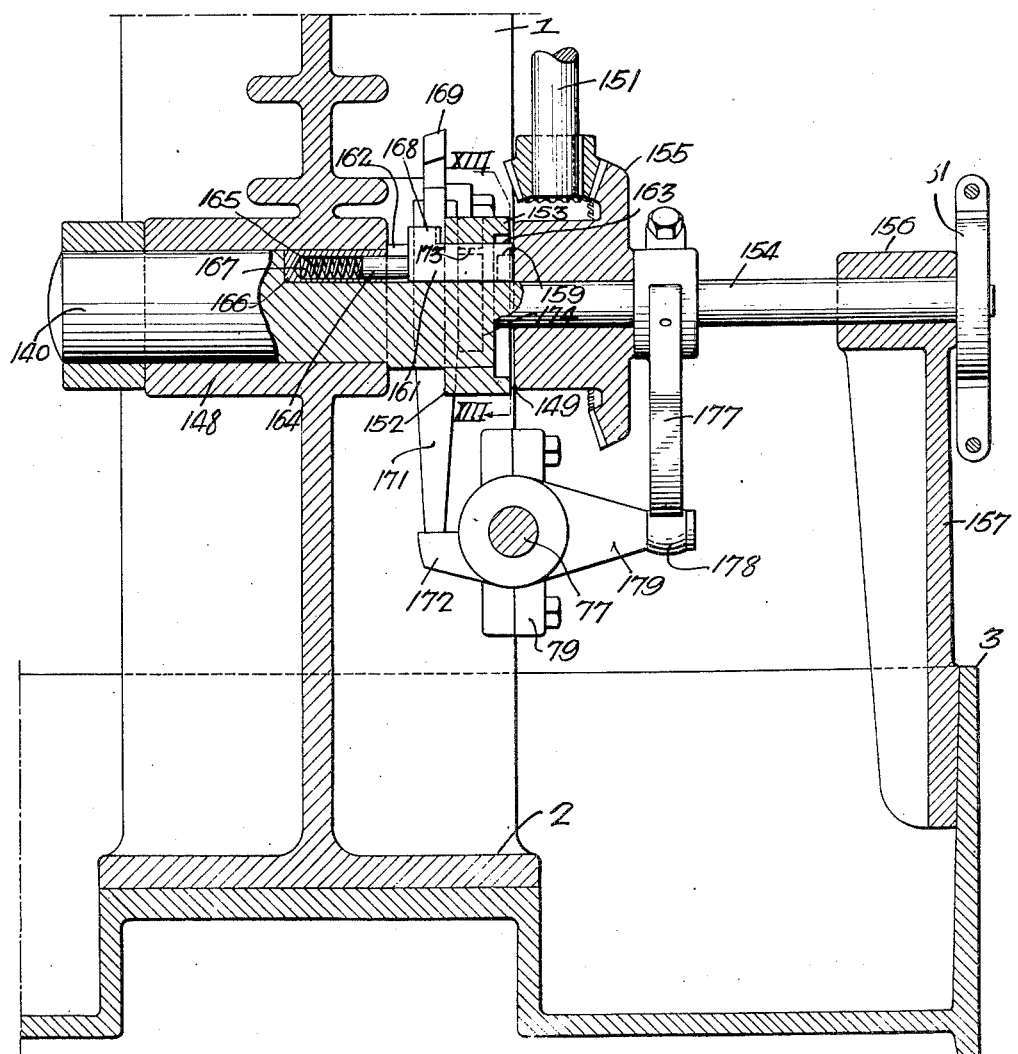

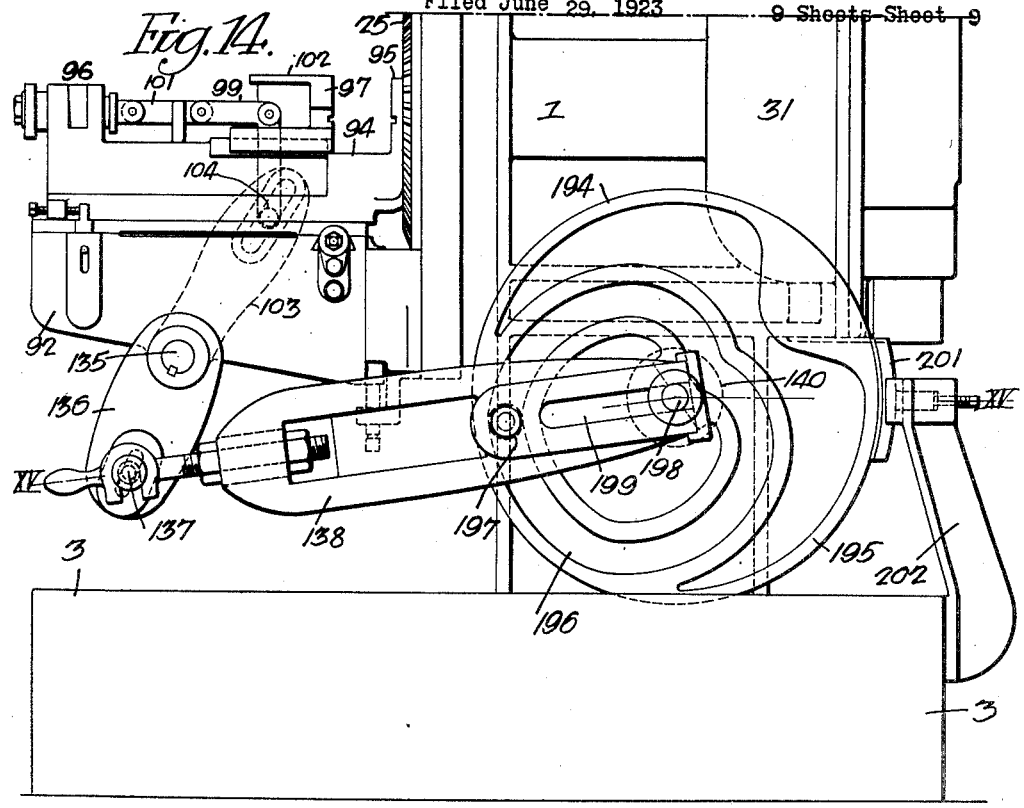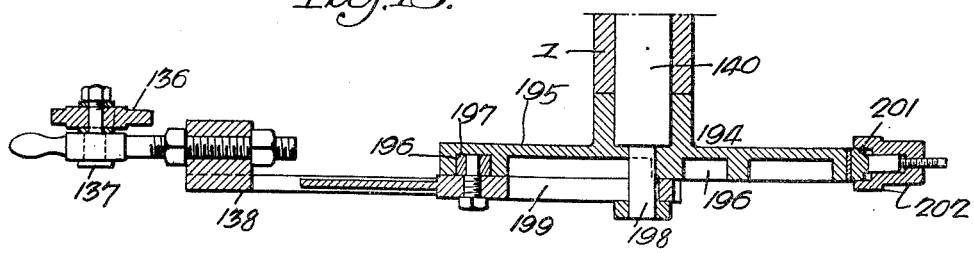

Patented Jan. 17, 1928.

1,656,758

UNITED STATES PATENT OFFICE.

JOHN R. SAYLOR, OF POTTSTOWN, PENNSYLVANIA; ELIZABETH E. SAYLOR, EXECUTRIX OF SAID JOHN R. SAYLOR, DECEASED, ASSIGNOR TO POTTSTOWN MACHINE COMPANY, OF POTTSTOWN, PENNSYLVANIA, A CORPORATION OF PENNSYLVANIA.

AUTOMATIC TAPPING MACHINE.

Application filed June 29, 1923. Serial No. 648,526.

My invention relates to automatic machines having particular relation to reaming and tapping machines.

In its broadest aspect, the object of my invention is to provide a machine of the class specified which obviates the necessity of hand-feeding and which is automatically operable continuously to remove work from a magazine, to carry the same to a work position, to effect a desired tapping or reaming operation, and then to discharge the finished article from the machine.

A more specific object of my invention is to provide a reaming and tapping machine comprising a magazine, a revolubly mounted spindle having a longitudinal component of travel, a chuck, means for reciprocating the chuck between points in alignment with the spindle and the receptacle, respectively, means automatically operable to turn the spindle in opposite directions and then to stop the same, means cooperating with said last-mentioned means for rendering said chuck-actuating means effective only when said spindle automatic means has operated to stop said spindle.

Another object of my invention is to provide in a machine of the type specified clutch mechanism which is characterized by the provision of a pair of revoluble members having abutting spaced end portions, one of said members having a lug projecting into the space therebetween, the other member being provided with a recess for the reception of a pin, resilient means for forcing said pin into the space between said members, said lug and pin constituting the connecting elements between said members, and means for withdrawing said pin from engagement with said lug.

A further object of my invention is to provide a novel mechanical combination adapted for use in reaming and tapping machines, wherein is provided a movably mounted chuck having relatively movable jaws, toggle mechanism operatively associated with one of said movable jaws and with said chuck, said mechanism having open and closed positions, where the jaws are spaced maximum and minimum distances, respectively, actuating means associated with said toggle mechanism, and means for causing the toggle to assume an open position when the chuck has moved a predetermined distance.

A still further object of my invention is to provide a machine comprising vertically upright members containing a series of articles, said magazine having discharge apparatus comprising a pair of depending spaced guideways terminating in base portions, the latter being provided with resiliently mounted centering pins, a reciprocally mounted chuck having relatively movable jaws, the path of travel of which lies intermediate said spaced guideways, one of said jaws having a plate adapted to prevent an article moving into said discharge opening other than when the latter lies intermediate said jaws.

A still further object of my invention is to provide a magazine with discharge apparatus, wherein so-called L-fittings may be maintained in a desired position to be embraced by the jaws of a movable chuck.

A still further object of my invention is to provide a safety clutch which is automatically operable to effect a break in the movable-clutch driving mechanism in the event of the jamming of the same.

With these and other objects and applications in mind, my invention further consists in the details of construction and operation and arrangement hereinafter set forth and claimed and illustrated in the accompanying drawings, wherein Fig. 1 is a side elevational view of my invention as applied to a machine for tapping fittings, etc., one of the spindle heads and a portion of the driving gearing thereof being shown in longitudinal section on the line I—I of Fig. 2;

Fig. 2 is a front elevational view of the apparatus of Fig. 1;

Fig. 3 is an enlarged, detail, side-elevational view of the magazine, showing the movable chuck in the tapping position, and the means for insuring the release of the finished article after the chuck jaws have moved from beneath the cutting tool, the end portion of the movable chuck constituting a resilient mounting for one end portion of the toggle joint being broken away;

Fig. 4 is a view similar to Fig. 3 but showing the movable chuck in the work-receiving position, wherein the magazine discharge opening is positioned intermediate the relatively movable jaws of the chuck;

Fig. 5 is an enlarged, detail, transverse-sectional view of the magazine and the movable chuck, the sectional plane being taken on the line V—V of Fig. 4;

Figs. 6 and 7 are enlarged, detached, perspective views illustrating the construction of the magazine discharge apparatus;

Fig. 8 is a sectional detail view of the magazine discharge apparatus slightly modified to receive L-liftings rather than T-fittings, as in the previous figures;

Fig. 9 is a top plan view of the structure of Fig. 8;

Fig. 12 is an enlarged, detail, longitudinal-sectional view of the clutch adapted to disengage the chuck-actuating mechanism, and associated trip levers, the sectional plane being taken on the line XII—XII of Fig. 1;

Fig. 13 is a sectional elevation on the line XIII—XIII of Fig. 12;

Fig. 14 is a detail, side elevational view of an alternative arrangement in the chuck actuating mechanism; and Fig. 15 is a sectional view on the line XV—XV of Fig. 14.

Figure 10:
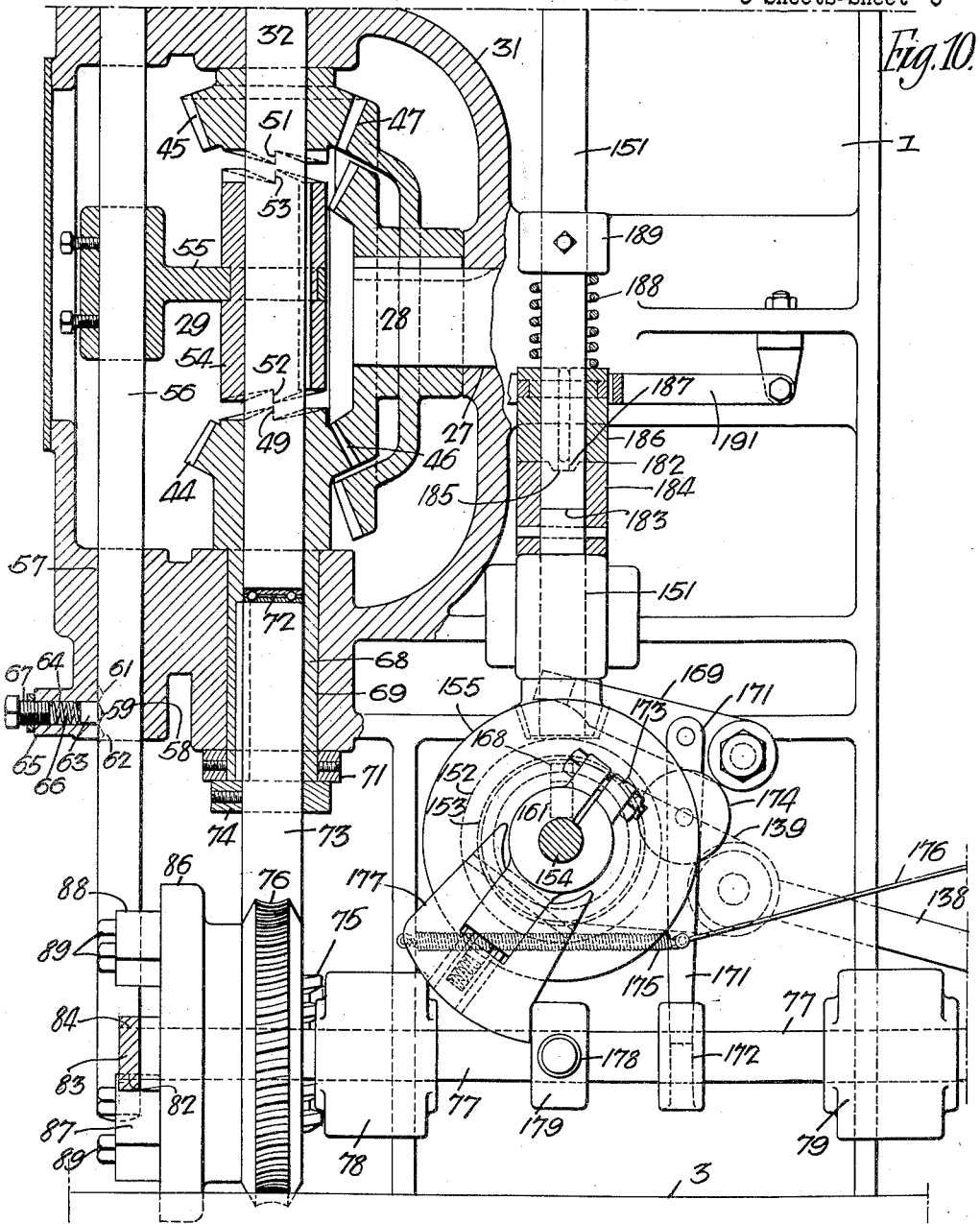
Fig. 10 is an enlarged, detail, side-elevational view of the gear mechanism for effecting the intermittent operation of the spindles and of the movable chuck, a portion of the gear mechanism being shown in longitudinal section.

Referring more especially to Figs. 1 and 2 of the drawing, a vertically upright frame 1 is provided with base flanges 2 which are mounted in a receptacle 3 for receiving such oil as drains from the machine during the operation thereof. A front end of the machine has secured thereto an angular face-plate 4 having an outwardly extending cylindrical portion 5 defining a space 6 and a laterally extending flange portion 7, the latter being provided with a smooth sliding surface 8 having a keyway 9 provided with an enlarged base porton 11.

A series of spindle heads 12, the number of which depends upon the number of holes to be simultaneously tapped or bored, comprise longitudinally extending cylindrical portions 13 and integral flange portions 14 and 15. The integral flange portions 14 and 15 are provided with plane surfaces adapted to slide over the face-plate surface 8 and are secured thereto in any desired position by studs 16 having one end thereof provided with head portions positioned in the annular recess 11 and the other end portion engaged by clamping nuts 17.

The cylindrical portion 13, Fig. 1, of the spindle heads 12 are provided with longitudinally extending perforations 18 which are partially closed at opposite ends by inner and outer sleeves 19 and 21, respectively. The inner sleeve 19 has rigidly secured thereto a ring 22 which is mounted in a recess 23 provided in the cylindrical portion 13 of the spindle heads 12, thereby preventing longitudinal movement of the sleeve 19. The end of the sleeve 19 terminates in a bevel-gear wheel 24, which meshes with a cooperating bevel-gear wheel 25 positioned in the space 6 defined by the cylindrical wall 5 and rigidly secured to an end portion 26 of a horizontally extending driving shaft 27. The remaining end portion 28 of the driving shaft 27 is associated through selectively operated reversing mechanism 29, Fig. 10, which is partially contained in a gear box 31, with a vertical driving shaft 32. The latter is operatively associated with a main-driving pulley wheel 33 through mechanism, of well-known design, which is contained in a change-gear box 34, all as will be explained more fully hereinafter.

The outer end of the remaining sleeve 21 is provided with a flange portion 35 which is rigidly secured in position by a releasable clamp member 36. The sleeve 21 is further provided with a master thread which meshes with a correspondingly threaded portion 37 on the outer end portion of a spindle 38. The inner end portion of the spindle 38 is splined to the revoluble sleeve 19 and it may be provided with a tap 39 or other cutting tool, as desired. The periphery of the flange 35 is provided with grooves 41 adapted to receive a shoulder portion 42 of a hinge-locking clip 43, whereby slight adjustments may be made in the relative position of the threaded portions of the spindle 38 and the sleeve 21. The mechanical strength of the locking clip 43 is such that, in the event of the jamming of the spindle 38, or other excessive strain on the driving mechanism connected therewith, the clip 43 will break, thus relieving the strain.

In the operation of the spindle-head mechanism just described, when the shaft 27 is driven in one direction, the driving gear-wheel 25 is rotated to correspondingly revolve the cooperating gear-wheels 24, which are revolubly mounted in the several spindle heads 12, thereby causing the turning of the spindles 38. The rotation of the several spindles 38 or rather the relative movement of the threaded portions of the sleeves 21 and the spindles 38, incident to the turning of the latter, causes the spindles 38 to have a longitudinal component of travel as well as the rotatable component just mentioned. Hence the several taps 39 may be moved inwardly or outwardly depending upon the direction of rotation of the driving shaft 27.

Figure 11:
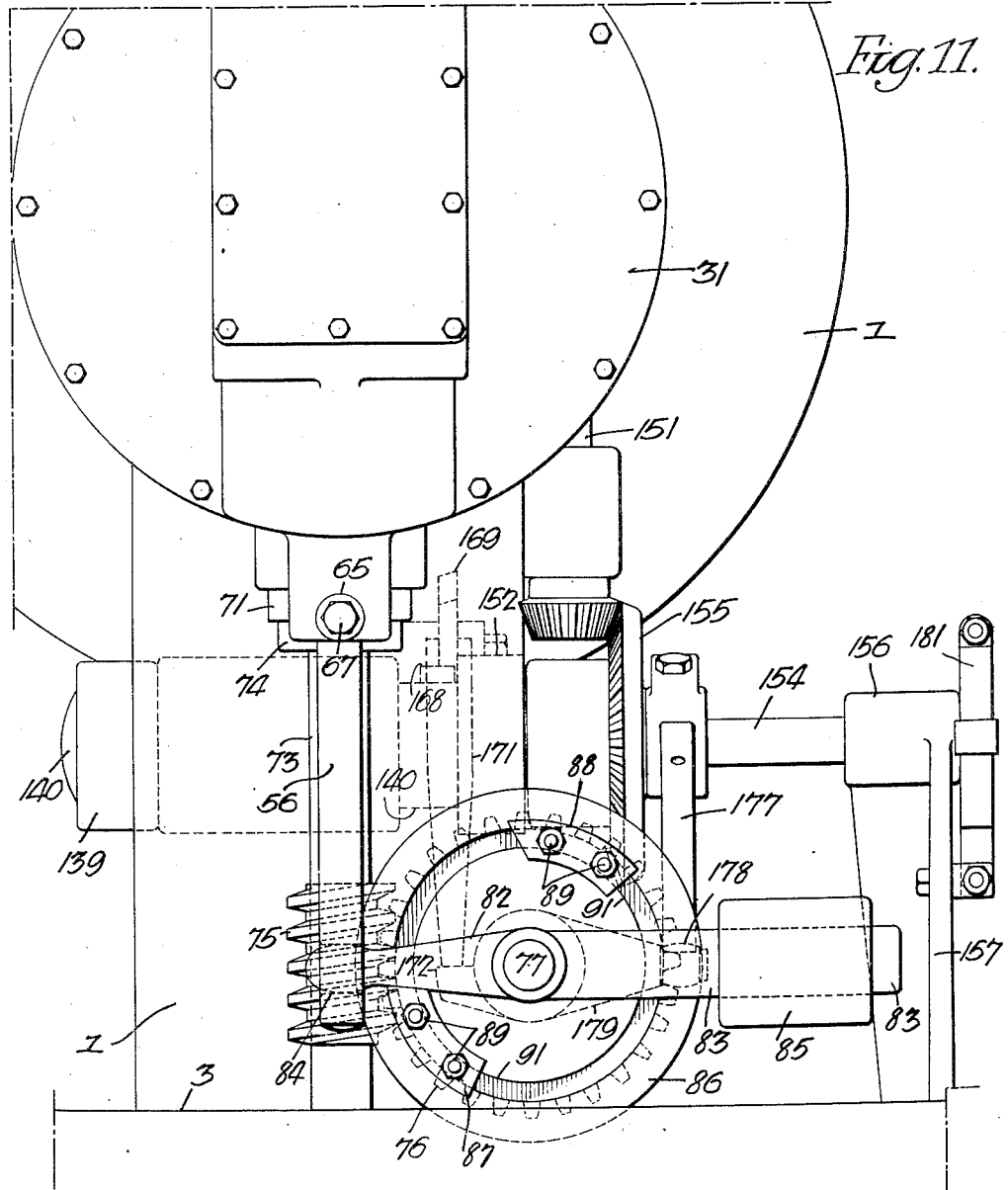
Fig. 11 is an end elevational view of the apparatus of Fig. 10.

The reversing mechanism 29, of which Figs. 10 and 11 are particularly illustrative, is so designed as to cause the several spindles 38 to effect a forward and return movement only. The reversing mechanism 29 for carrying this desired result into effect comprises a vertically-positioned driving shaft 32 carrying spaced gear-wheels 44 and 45 which mesh with cooperating bevel gear-wheels 46 and 47, respectively, keyed to the horizontal driving shaft 27. The bevel gear-wheel combination 44, 46 causes the horizontal driving shaft 27 to be rotated at a faster speed than the bevel gear-wheel combination 45, 47 by reason of the higher gear ratio in the former combination as compared to that in the latter.

Adjacent faces of the gear-wheels 44 and 45 are provided with teeth 49 and 51, respectively, which are adapted successively to engage cooperating teeth 52 and 53, respectively, formed on the opposite end portions of a clutch sleeve 54 slidably mounted on the vertical driving shaft 32. The clutch sleeve 54 is provided with an arm 55 which is rigidly secured to a vertically movable shift rod 56. The lower end portion of the shift rod 56 extends through a perforation 57 in the rear end portion of the machine frame 1, to a point near the base thereof.

The shift rod 56 may be held in a neutral position, where the clutch sleeve 54 is out of engagement with either of the driving pinions 44 and 45, or in forward or reverse positions, where the clutch sleeve 54 is in engagement with the driving pinion 45 or 44, respectively, by providing a portion 58 of the shift rod 56, which extends through the perforation 57, with grooves 59, 61 and 62 which correspond respectively to the several positions just mentioned. A stop member 63 is positioned in a perforation 64 formed in a projecting lug portion 65 of the machine frame 1, and it is normally held in engagement with one of the grooves by a spring 66, the force thereof being adjusted by a member 67.

The driving pinion 44 is provided with a depending annular sleeve 68 which is mounted in a perforation 69 positioned in axial alignment with the vertically-extending shaft 32 and has an open end portion thereof provided with a collar 71. The lower end of the vertically-positioned shaft 32 rests upon a thrust bearing 72, which, in turn, is mounted on the upper end of a vertically-positioned shaft 73 splined to the sleeve portion 68 of the driving pinion 44. A collar 74 may be rigidly secured to the portion of the shaft 73 just beyond the collar 71. A worm 75 is mounted on the lower end of the shaft 73 and it cooperates with a wheel 76 which is rigidly mounted on a horizontally-extending shaft 77 mounted in bearings 78 and 79 formed on the side of the main machine frame 1.

The shaft 77 may be extended toward the front end of the machine and mounted in a bearing 80, Fig. 1, which is carried by the oil drainage box 3, the extreme end portion of the shaft 77 being formed to provide an adjusting head 81, for reasons as will appear more fully hereinafter. A rear end portion of the shaft 77 is provided with oppositely-directed lever arms 82 and 83, the end of the former being mounted in a recess 84 in the lower end portion of the clutch rod 56, whereby the rocking of the shaft 77 effects a reciprocating movement of the clutch rod 56. The lever arm 83 carries a counter weight 85.

The worm-wheel 76 may be provided with a projecting portion constituting a face plate 86. A pair of dogs 87 and 88 are adjustably secured to the face plate 86 by bolts 89 which are positioned in an angular recess 91 formed therein. In Figs. 10 and 11, the dog 87 is so positioned that it actuates the clutch sleeve 54 out of engagement with the bevel gear-wheel 44 to prevent further outward movement of the taps 39. The dog 88 is so positioned that its actuated into engagement with the lever 82 to move the clutch sleeve 54 out of engagement with the gear-wheel 45 and into engagement with the gear-wheel 44 when the spindles 38, Fig. 1, have completed their working stroke.

In operation, when the clutch sleeve 54, Fig. 10, is actuated into engagement with the bevel gear-wheel 45 by means hereinafter to be described, the vertically-positioned driving shaft 32 is directly connected to the bevel gear-wheel 25 through the bevel gear-wheels 45 and 47 and the shaft 27, thereby causing the taps 39 to move from their outermost position to their innermost position. As the taps 39 are moved inwardly, the wheel 76 is also turned by reason of the operative connection between the shaft 73 and the sleeve 68 and also that between the bevel gear-wheels 44 and 46, respectively. The turning of the face plate 86, incident to the forward movement of the taps 39, causes the dog 88 to be actuated into engagement with the lever 82 when the taps 39 have reached their most forward position, thereby moving the clutch rod 56 downwardly. The movement of the clutch rod 56 is such as to cause the clutch sleeve 54 to be actuated out of engagement with the bevel gear-wheel 45 and into engagement with the bevel gear-wheel 44, thereby reversing the operative connection between the shaft 32 and the shaft 27 and causing the taps 39 to be moved outwardly.

The reversal in the direction of movement of the taps 39 causes a corresponding reversal in the direction of movement of the face plate 86 and this movement continues until the dog 87 has been actuated into engagement with the arm 82 to cause the clutch rod 56, to be actuated upwardly. The upward movement of the latter causes the clutch sleeve 54 to be actuated out of engagement with the bevel gear-wheel 44 into the neutral position shown in Fig. 10 of the drawing. As hereinafter stated, when the clutch sleeve 54 has assumed the neutral position, the taps 39 have completed their return stroke.

In Fig. 1, a bracket 92 is shown secured to a lower portion of the face plate 4 and it is provided with a vertically adjusting screw operating in a manner understood by those skilled in the art. The top side of the bracket 92 is provided with an undercut rib 93, Fig. 5, which serves as a slidable mounting for a movable chuck 94. The latter comprises a stationary jaw 95 on the end thereof immediately adjacent to the face plate 4 and a resilient abutment construction 96 on the outer end thereof. Inasmuch as the details of the resilient abutment construction 96 have been previously described in my Patent No. 1,089,273, dated March 3, 1914, a detailed description is deemed unnecessary. A cooperating movable jaw 97 may be slidably mounted for longitudinal motion on ways 98 formed on the top side of the movable chuck 94. A bell-crank lever 99 is pivotally mounted on the movable jaw 97 and it has one end thereof connected by a link 101 with the resilient abutment 96. The movable jaw 97 may be provided with an extension 102 for reasons as will appear hereinafter.

A slotted arm 103, Figs. 3 and 4, engages a pin 104, which is carried by the remaining arm of the bell-crank lever 99, whereby the movable chuck 94 and the relatively movable jaw 97 may be actuated, as will be explained more fully hereinafter. A pair of adjustable lugs 105 and 106, which are mounted on the movable chuck 94, cooperating with a pin 107, which is carried by the bracket member 92, serve to limit the forward movement of the movable chuck 94 to a point where such work as may be contained between the jaws 95 and 97 is in alignment with the taps 39, as shown in Fig. 1, and the reverse movement to a point where the jaws 95 and 97 are in alignment with the discharge opening of a work magazine, 108, as shown in Fig. 4.

The work magazine 108, Fig. 5, which in this particular instance has been designed to receive and to discharge T-fittings, comprises a plurality of vertically-extending guide strips 109 which are mounted on a plate 111 supported by side plates 112 and 113 rigidly secured to opposite sides of the bracket 92. The supporting plate 111 is provided with a central opening 114 through which the T-fittings are adapted to pass into a discharge structure 115, which is positioned in the path of travel of the movable clutch 94, whereby the movable jaws 95 and 97 may embrace and remove a fitting therefrom.

The discharge structure 115, of which Figs. 6 and 7 are detail perspective views and Fig. 5 is a side elevational view of the completed structure, comprises a pair of spaced extensions 116 and 117 of the strips 109 and base members 118 and 119, respectively, the extensions 116 and 117 constituting guideways for the fittings as they leave the magazine 108 and move into the chuck-engaging position shown in Fig. 4. The base members 118 and 119 comprise longitudinally-extending members having horizontal and vertical sides 121 and 122, respectively, the latter being rigidly positioned in recesses 123 in the extensions 116 and 117 and constituting continuations of the guideways formed by said extensions. The horizontally-extending sides 121 are provided with spaced perforations 124 adapted to removably receive centering pins 125 which are carried by plate members 126.

The plate members 126 are held in position to cause the several centering pins to extend up through the corresponding perforations by means of strips 127 having base portions 128 secured to plate members 126 and vertically extending portions 129 secured by springs 130 to the extensions 116 and 117.

The construction shown in Figs. 8 and 9 has been modified to provide for the centering of L-fittings rather than T-fittings as just described and differentiates over that of Fig. 5 in the provision of a shoe 131 for guiding the L-fittings as they pass from the magazine opening 114 into a discharge structure 132. The modification in the discharge structure 132 comprises the shortening of one of the extensions, say 116, and the mounting of a perforated plate 133 directly in the surface thereof. The centering pins 125 may be resiliently held in the perforations of the plate 133 by the force of the springs 130. The construction herein employed is otherwise the same as that just described in connection with the discussion of Figs. 6 and 7.

Further precautions may be observed to properly center the work, other than those effected by the resiliently mounted centering pins 125, as the jaws 95 and 97 are about to embrace the same, by providing said jaws with outwardly extending centering springs 134, as shown for instance in Fig. 4, where the springs 134 are extended, or in Fig. 3, where the springs 134 are compressed.

Referring to the chuck-actuating mechanism shown more particularly in Figs. 1, 3 and 4 of the drawings, the arm 103 is keyed to an actuating shaft 135 having an arm 136 at the outer end thereof. The rocker arm 136 is slotted for the reception of a pin 137 which provides a pivotal mounting for one end of a connecting link 138, the other end of which is pivotally mounted to the end portion of a lever arm 139 keyed to a horizontally-positioned shaft 140.

The other end of the rocking shaft 135 carries a crank 141 which is operatively associated by means of a link 142 with a locking pin 143. The latter is reciprocally mounted in a boring 144 in the bracket 92 and it is adapted to be reciprocated by the link 142 into and out of the path of a lug 145 mounted on the movable clutch 94.

The end of the link engaging the pin 143 is slotted, thereby providing for the relative movement of the link 142 and the pin 143, while a spring 146, which is contained in the boring 144 between the base thereof and the pin 143, normally forces the latter to its outermost position, as shown in Fig. 3. One corner of the lug 145 is formed square, while the opposite corner is formed with a bevel surface 147, for reasons as will appear more fully hereinafter.

The arrangement of the crank 141 and the link 142 is such as to cause the pin 143 to engage the lug 145 to lock the chuck 94, when the jaws 95 and 97 thereof have moved from the position of Fig. 3 a distance sufficient to bring such finished work as is contained therebetween out of alignment with the taps 39. Further motion of the rocker shaft 135 causes the arm 103 to move to break the toggle joint formed by the bell-crank lever 99 and the link 101.

The further turning of the shaft 135, however, causes the crank 141 to withdraw the locking pin 143 out of engagement with the square corner of the lug 145, permitting the chuck to finally assume the position of Fig. 4. When the motion of the chuck 94 is reversed, the bevel surface 147 of the lug 145 subsequently engages the pin 143, so that the latter is moved downwardly by reason of the slotted connection between the same and the link 142, permitting the chuck to continue unrestricted in its movement to the working position illustrated in Fig. 3. Attention is also directed to the fact that the movable jaw extension 102 serves to permit articles to enter the discharge structure 115 only when the chuck 94 has moved into the work-receiving position.

The laterally-extending shaft 140 is mounted in a bearing 148 formed in the machine frame 1 and associated through a clutch mechanism 149 with a vertical driving shaft 151 having an operative connection with the main driving pulley wheel 33 through the gear-wheel mechanism contained in the gear-shift box 34. The clutch mechanism 149 comprises a collar 152 which is rigidly secured to the shaft 140 and which is provided with a forwardly projecting flange portion 153. A portion 154 of the shaft 140 extending beyond the base portion of the flange 153 is of reduced diameter and it serves to provide a loose mounting for a bevel gear-wheel 155. The end portion 154 may be mounted in a bearing 156 formed in a pedestal 157 secured to a side portion of the oil receptacle 3. The end portion 154 is provided with projecting lugs 158 and 159 which are designed to extend into the space defined by the projecting flange portion 153.

A key 161 is slidably mounted in one end portion of a groove 162 formed in the shaft 140 and it has an end portion 163 thereof normally held in the space formed by the flange 153 by means of a resiliently mounted plunger rod 164. The plunger rod 164 has one end thereof positioned in a boring 165 formed in a member 166 which is mounted in the remaining end portion of the groove 162, and the other end thereof in engagement with the outer end of the slidably mounted key 161. A spring 167, which is positioned in the boring 165 between the base thereof and the plunger rod 164, may serve to hold the latter in resilient engagement with the key 161.

When the key 161 is in the position indicated in Fig. 12, where the inner end thereof projects into the space defined by the flange 153, the horizontally-positioned shaft 140 is disconnected from the vertically-positioned shaft 151 until the bevel gear-wheel 155 has turned through such angle as to cause one of the projecting lugs 158 and 159, say the latter, to be actuated into engagement with the projecting end portion 163 of the pin 161, as shown for instance in Fig. 13. The subsequent operation of the shaft 151 causes a reciprocating movement of the slidable chuck 94 through the linkage mechanism just described.

In order to prevent the movable chuck 94 from being actuated out of alignment with the spindles 38, when the taps 39 are being moved inwardly to effect the tapping of the work carried thereby, I disconnect the horizontally-positioned driving shaft 140 from the vertically-positioned driving shaft 151 by moving the slidable pin 161 out of engagement with either of the lugs 158 or 159. To this end, I provide the outer end portion of the pin 161 with a vertically-positioned shoulder portion 168 which is spaced from an adjacent side of the collar 152 to provide for the entrance therebetween of an end portion of a pivotally-mounted wedging lever 169.

In operation, the lever 169 normally rests upon the surface of the shaft 140 and it operates to withdraw the key 161 out of engagement with either of the lugs 158 and 169 only when the shoulder 168 has been actuated into engagement therewith. When such condition obtains, the operative connection between the shafts 140 and 151 is broken and the bevel gear-wheel 155 merely revolves loosely upon the shaft portion 154, thereby preventing further movement of the sliding chuck 94. The disengagement of the clutch 149 just described occurs when the sliding chuck 94 has been so moved as to bring the work contained between the jaws thereof into direct alignment with the taps 39.

A link 171 has the upper end thereof pivotally mounted on the vertically-swinging wedge lever 169 and the lower end thereof in engagement with the end portion of a lever 172 which is mounted on the shaft 77 carrying the clutch-rod operating lever 82. In practice, the lever arm 171 is so positioned that when the clutch sleeve 54 is in the neutral position, the wedging lever 169 is held out of engagement with the shaft 140, as shown in Fig. 10. When the shaft 77 is rocked, to cause the clutch sleeve 54, Fig. 10, to be actuated out of engagement with the bevel gear-wheel 45 and into engagement with the bevel gear-wheel 44, the end of the lever 172 will have moved downwardly to such extent as to permit the end of the trip lever 171 to engage the top side of the actuating lever 172, as will presently appear.

The collar 153, Fig. 13, is provided with a projecting portion 173 which may be actuated into engagement with a revolubly mounted disk 174 carried by the trip lever 171, and it operates to move the end of the trip lever 171 from the upper side of the arm 172, thereby permitting the wedging lever 169 to fall so that the outer end thereof rests upon the shaft 140. A spring 175, Fig. 1, has one end secured to the machine frame 1, and the other end to the trip lever 171, whereby the disk 174 may be held in resilient engagement with the collar 152. The tripping of the lever 171 may be effected at will, by means of a trip rod 176 which extends from the lever 171 to the front end of the machine, as shown in Fig. 1.

The tripping of the lever 171, just described, occurs in that portion of the cycle of operation of my machine when the taps 39 have been moved to their outermost position and disconnected from the driving source, through the engagement of the dog 87, Fig. 11, with the clutch-rod lever arm 82, which causes the clutch sleeve 54 to be actuated out of engagement with the bevel gear-wheel 44.

Furthermore, the operative connection between the horizontally positioned shaft 140 and the vertically positioned driving shaft 151 of the sliding chuck driving mechanism is not disturbed inasmuch as the wedge lever 169 is resting on the shaft 140. The end portion of the wedge lever 169, Fig. 12, is not brought into engagement with the shoulder portion 168 of the pin 161 to disengage the clutch 149 until the shaft 140 has made one complete revolution, during which interval of time, the sliding chuck 94 has moved from the work position to the work-receiving position and return.

In order to render effective the tap-actuating mechanism, when the sliding chuck 94 has moved into alignment with the taps 39, I provide a cam 177 on the shaft 140 which cooperates with a roller 178 carried by a lever arm 179 mounted on the shaft 77. In operation, the cam 177 engages the lever arm 179, only when the movable chuck 94 is in the work or so-called "tapping" position, and it operates to move the clutch sleeve 54 from the neutral position shown in Fig. 10 to the work position, wherein said clutch sleeve 54 is in engagement with the bevel gear wheel 45.

Experience has shown that the operation of the mechanism embodying my invention is greatly improved by exerting a braking effect on the horizontally-positioned check shaft 140. To this end, I have mounted a manually adjustable brake 181, Fig. 12, of usual design on the reduced portion 154 of the shaft 140.

In order to insure the interruption of the chuck-driving mechanism, in the event of the jamming of the same, I provide a safety clutch 182 on the vertically-positioned driving shaft 151. The shaft 151 is broken along the line 183, one end thereof being provided with a collar 184 having a recess 185. The other end is provided with a slidably mounted collar 186 having a depending tongue portion 187 adapted to engage the recess 185, whereby the two shaft portions may be operatively associated. The collar 186 is normally held in resilient engagement with the collar 184 by means of a spring 188 which is interposed between the clutch collar 186 and an abutment 189 on the shaft 151. A hand lever 191, which is pivotally mounted on the machine frame 1, is secured to the movable clutch collar 186, whereby the operative connection between the two portions of the shaft 151 may be manually interrupted. A catch member 192, which is mounted on the gear casing 31, Fig. 1, may be employed to retain the lever 191 in a desired shaft-disengaging position.

Assuming the apparatus in the general position shown in Figs. 1 and 3 of the drawing, movement of the sliding chuck 94 from the tapping position, wherein the work contained between the jaws 95 and 97 is in direct alignment with the taps 39, is prevented by the wedge lever 169 which has moved the slidable clutch pin 161 out of engagement with one of the lugs 158, 159. Attention is directed to the fact that operation of the vertically-positioned driving shaft 151, with the clutch 149 in the disengaging position, is effective only to turn the bevel gear-wheel 155 which is mounted loosely on the reduced portion 154 of the chuck-driving shaft 140. In the foregoing position of the driving apparatus, the end of the trip lever 171 engages the side of the lever 172.

Moreover, the clutch sleeve 54 is in engagement with the bevel gear-wheel 45, thereby causing the spindles 38 to revolve in such direction that the same are moved inwardly. The inward movement of the spindles 38 continues until the work has been operated on to the desired extent, whereupon the direction of rotation of the spindles 38 is reversed to move the taps 39 out of the work at an increased speed. The outward movement of the taps 39, just mentioned, is brought about by the actuation of the dog 88, Fig. 11, into engagement with the lever arm 82 through the operative connection of the driving mechanism comprising the worm-wheel mechanism 75, 76, the bevel gear-wheels 44, 46 and the driving bevel gear-wheels 45, 47, with the driving shaft 32.

The actuation of the dog 88 into engagement with the lever arm 82 moves the clutch rod 56, Fig. 10, downwardly and, as a consequence, the clutch sleeve 54 is moved out of engagement with the bevel gear-wheel 45 and into engagement with the bevel gear-wheel 44, thereby reversing the direction of rotation of the spindles 38.

The downward movement of the lever arm 82, which occurs when the dog 88 is actuated into engagement therewith, effects a corresponding downward movement of the lever arm 172, Fig. 12, thereby permitting the trip lever 171 to swing from the position shown in Fig. 1 to a position wherein the end of the trip lever 171 is directly over the upper side of the end portion of the lever 172.

The outward movement of the taps 39 is interrupted, when the same have cleared the work contained between the movable jaws 95 and 97, through the actuation of the dog 87 into engagement with the lever arm 82, thereby moving the clutch sleeve 54 out of engagement with the bevel gear-wheel 44 into the neutral position shown in Fig. 10, where the operative connection between the spindles 38 and the vertically-positioned driving shaft 32 is interrupted.

The upward movement of the lever arm 82, incident to the actuation of the clutch sleeve 54 into the neutral position, causes a corresponding upward movement of the lever arm 172. Inasmuch as the end of the trip link 171 is in engagement with the top side of the lever arm 172, the upward movement of the same causes the wedge lever 169 to be moved out of engagement with the slidably mounted pin 161, thereby permitting an operative connection to obtain between the shafts 151 and 140 of the chuck-driving mechanism.

When the shaft 140 has turned through an angle sufficient to actuate the clutch pin 161 from directly beneath the wedging lever 169 the lug 173, Fig. 10, engages the roller 174 on the trip lever 171 causing the end thereof to be actuated out of engagement with the upper side of the lever 172 into the position shown in Fig. 1. The end portion of the wedge lever 169 is thus permitted to rest on the revoluble shaft 140.

When the chuck-actuating mechanism is rendered effective, the slidable clutch 94 is moved from the work position until the lug 145, Fig. 3, engages the cam operated pin 143. Further movement of the lever arm 103 causes the toggle formed by the link 101 and the bell-crank lever 99 to break, moving the sliding jaw 97 an amount sufficient to release the finished work. When the work has been released, it passes from the machine through a chute 193, Fig. 5, to a receptacle (not shown). Further motion of the shaft 135 causes the locking pin 143 to be withdrawn out of engagement with the lug 145 and the movable chuck 94 to be actuated to a work-receiving position, as shown in Fig. 4.

As the movable jaw 97 and plate 102 are actuated past the outlet opening 114 of the magazine 108, a fitting moves into the discharge structure 115 where it is in position to be grasped by the jaws of the movable chuck 94, as shown in Fig. 4. Further movement of the shaft 135 causes the work or fittings to be grasped firmly between the jaws of the chuck 94 and moved into the tapping position previously mentioned.

As the chuck 94 is moved into the tapping position, the cam 177 is actuated into engagement with the lever arm 179 to move the same downwardly and, consequently, the lever arm 82 upwardly, thereby causing the sleeve 54 to be actuated from the neutral position into engagement with the bevel gear-wheel 45. The spindles 38 are thus operatively associated with the driving shaft 32 in such manner as to cause the same to move inwardly for the tapping operation. Substantially simultaneous with the actuation of the clutch sleeve 54 into engagement with the gear-wheel 45, the end of the wedge lever 169 is actuated into engagement with the pin 161 to disconnect the driving shaft 151 from the driven shaft 140, whereupon the foregoing cycle of operations is again automatically repeated.

In Figs. 14 and 15 are shown side-elevational and longitudinal-sectional detail views, respectively, of an alternative construction for interconnecting the chuck-actuating link 138 and the driving shaft 140, which comprises a cam-plate construction 194. The cam-plate construction 194 comprises a cam plate 195, which is mounted on the end portion of the horizontally-positioned shaft 140. The face of the cam plate 195 is provided with a groove 196 for the reception of a follower element 197 which is revolubly mounted on a link 138, as shown in Fig. 14, while the remaining end thereof is pivotally mounted on a pin 198 which projects from the end of the horizontally-positioned shaft 140. The latter end portion may be provided with a slot 199, whereby the link 138 may move relative to the pin 198 as the cam plate 195 is revolved.

The construction shown in Figs. 14 and 15 further differentiates over that of the previous figures in that the brake 181, Fig. 12, which is mounted on the reduced end portion 154 of the horizontally-positioned shaft 140, has been replaced by a brake 201 of usual construction which is so mounted on a vertical upright arm 202 carried by the oil tank 3 as to frictionally engage the side of the cam plate 195.

In operation, when the cam plate 195 is revolved, the connecting link 138 is moved forwardly and backwardly in accordance with the irregular outline of the groove 196 in the face thereof to cause the sliding chuck 94 to have a reciprocating movement for the purposes hereinbefore specified. The operation of the construction of Figs. 14 and 15 is otherwise as indicated for that of the preceding figures.

While I have shown a particular embodiment of my invention, for the purpose of describing the same and illustrating its principles of construction and operation, it is apparent that various changes and modifications may be made therein, without departing from the spirit and scope of my invention. I desire, therefore, that only such limitations shall be imposed thereon, as are indicated in the appended claims or as are demanded by the prior art.

I claim:

1. In combination, a chuck, means for causing said chuck to move through a complete forward and return stroke and then stop, a spindle, means for turning said spindle in opposite directions and then stopping the same, and means for interconnecting said first and second-mentioned means, whereby the latter may be rendered effective to start said spindle when the former is rendered ineffective to stop said chuck.

2. In combination, a chuck, means for causing said chuck to move through a complete forward and return stroke and then stop, a spindle, means for causing said spindle to have a desired stroke and then come to rest, and means for interconnecting said first and second-mentioned means, whereby the former may be rendered effective to start said chuck when the latter is rendered ineffective to stop said spindle.

3. In combination, a magazine, a spindle, a chuck, means for reciprocating the chuck intermediate said magazine and said spindle, means for causing said spindle to turn in opposite directions and then stop, and means interconnecting said first and second-mentioned means automatically operable to render ineffective one actuating means while the other is effective.

4. In combination, a magazine, a spindle, a chuck, means for reciprocating the chuck between said spindle and said magazine, means automatically operable to move the spindle toward and away from the path of travel of said chuck and then bring the same to rest, and means responsive to said chuck actuating means for rendering effective said spindle operating means when said chuck has completed its stroke.

5. In combination, a receptacle, a revolubly mounted spindle having a longitudinal component of travel, a chuck, means for reciprocating the chuck between points in alignment with the spindle and the receptacle, respectively, means automatically operable to turn the spindle in opposite directions and then to stop the same, means cooperating with said last-mentioned means for rendering said chuck actuating means effective only when said spindle automatic means has operated to stop said spindle.

6. In combination, a receptacle, a revolubly mounted spindle having a longitudinal component of travel, a chuck, means for reciprocating the chuck between points in alignment with the spindle and the receptacle, respectively, means automatically operable to turn the spindle in opposite directions and then to stop the same, means cooperating with said last-mentioned means for rendering said chuck actuating means effective when said spindle automatic means has operated to stop said spindle, and means operable to start said spindle automatic means when said chuck has made one complete forward and return movement.

7. In combination, a receptacle, a revolubly mounted spindle having a longitudinal component of travel, a chuck, means for reciprocating the chuck between points in alignment with the spindle and the receptacle, respectively, said means including a disengaging clutch, means automatically operable to turn the spindle in opposite directions and then to stop the same, means for opening said clutch when said chuck has made one complete forward and return movement, means responsive to said automatic spindle means for rendering ineffective said clutch opening means, when said spindle automatic means has operated to stop said spindle, and means operable to start said spindle automatic means when said chuck is moved into alignment with said spindle.

8. In combination, a receptacle, a revolubly mounted spindle having a longitudinal component of travel, means automatically operable to turn the spindle in opposite directions and then to stop the same, a chuck, means for reciprocating the chuck between points in alignment with the spindle and the receptacle, respectively, said means including a disengaging clutch, and mechanism automatically operable to disengage said clutch as the chuck moves into alignment with said spindle, to substantially simultaneously render effective said spindle actuating means, and then, upon the stopping of the spindle to actuate said clutch to render effective said chuck actuating means.

9. In combination, a receptacle, a revolubly mounted spindle having a longitudinal component of travel, means automatically operable to turn the spindle in opposite directions and then to stop the same, said means including a shaft adapted to be rocked as the spindle passes through the starting, reversing and stopping operations, a chuck, means for reciprocating the chuck between points in alignment with the spindle and the receptacle, respectively, said means including a disengaging clutch, a movable member adapted to rest on said chuck reciprocating means, said movable member engaging said clutch to disengage the same only when said chuck has moved from the spindle to the receptacle and return, mechanism having an effective position wherein the motion of the shaft incident to the stopping of the spindles causes said movable member to raise out of engagement with said clutch, and means subsequently co-acting with said mechanism for rendering the same ineffective, causing the movable member to drop back on said chuck reciprocating means, said mechanism again assuming an effective position when said shaft is moved during the reversal of the direction of rotation of the spindles.

10. In combination, a receptacle, a revolubly mounted spindle having a longitudinal component of travel, means automatically operable to turn the spindle in opposite directions and then to stop the same, said means including a shaft adapted to be rocked as the spindle passes through the starting, reversing and stopping operations, a pair of oppositely extending levers carried by said shaft, a chuck, means for reciprocating the chuck between points in alignment with the spindle and the receptacle, respectively, said means including a disengaging clutch, a pivotally mounted lever having an end adapted to rest on said chuck reciprocating means, said pivotally mounted lever engaging said clutch only when said chuck has moved into alignment with said spindle, said pivotally mounted lever carrying a depending pivotally mounted trip lever adapted to be actuated by one of said pair of oppositely extending levers to move said first-mentioned pivotally mounted lever out of engagement with said clutch when said spindle is stopped, the relative arrangement of levers just mentioned constituting an effective position, means carried by said chuck reciprocating means for subsequently causing the first mentioned pivotally mounted lever to drop back on the same, said levers again assuming an effective position when said shaft is moved during the reversal of the direction of rotation of the spindles, and a cam carried by said chuck reciprocating means for moving at least one of said first-mentioned pair of levers to effect the starting of the spindle driving means only when said chuck has moved into alignment with said spindle.

11. In combination, a magazine, a chuck, means for causing said chuck to move between a work-receiving position and an operating position and then stop, said chuck having relatively movable jaws, a spindle positioned in alignment with one of said chuck positions, means for turning said spindle in opposite directions and then stopping the same, means for interconnecting said first and second-mentioned means, whereby the latter may be rendered effective to start said spindle when the former is rendered ineffective to stop said chuck, and means for causing the jaws of said chuck to open after the chuck has moved out of alignment with said spindle.

12. In combination, a magazine, a chuck, means for causing said chuck to move through a complete forward and return stroke and then stop, said stroke including a work-receiving position and an operating position, a spindle means for causing said spindle to have a desired stroke and then come to rest, and means for interconnecting said first and second-mentioned means whereby the former may be rendered effective to start said chuck when the latter is rendered ineffective to stop said spindle, said chuck also having a work-releasing position.

JOHN R. SAYLOR.